April 14, 1953     D. E. GULICK     2,634,943

FAUCET

Filed April 2, 1947

INVENTOR.
DAVID E. GULICK
BY William D. Carothers
his Atty.

Patented Apr. 14, 1953

2,634,943

UNITED STATES PATENT OFFICE 2,634,943

FAUCET

David E. Gulick, Kittanning, Pa., assignor to Eljer Company, Ford City, Pa., a corporation of Pennsylvania Application April 2, 1947, Serial No. 738,790

1 Claim. (Cl. 251—27)

This invention relates generally to valves, and particularly to water faucets employed on lavatories, tubs, and sinks or the like.

The principal object of this invention involves the problem of providing a compact water faucet having three principal parts, namely a body, a barrel, and a stem wherein relative movement is provided between the stem and the barrel requiring a single packing which seals the valve stem and blocks the water from the valve operating thread, thereby permitting retention of the lubricant on the valve operating thread.

Another object of this invention is the provision of a water faucet composed of a body, a barrel, and a stem provided with a swivel on its inner end which carries a valve washer that cooperates with the valve seat mounted in the body and also carries a seal that cooperates with the barrel.

Other objects and advantages appear in the following description and claim.

Practical embodiments illustrating the principles of this invention are shown in the accompanying drawing wherein.

Figure 1:
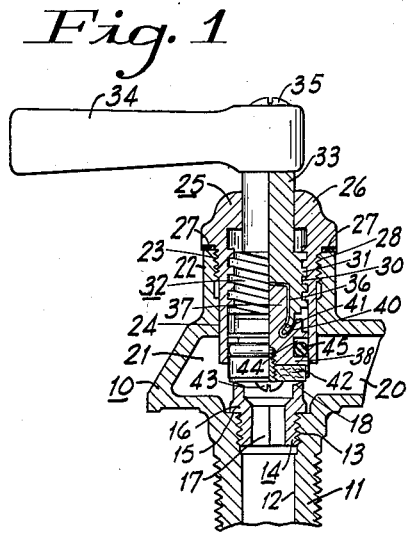
Fig. 1 is a sectional view of an exposed faucet comprising this invention, the inner end of the stem of which is swiveled.

Referring first to Fig. 1, 10 represents the faucet body which is provided with an externally threaded depending inlet connection 11 arranged to receive a coupling on the end of the pipe connected to a water system. The bore 12 of the inlet 11 is threaded as indicated at 13 to receive the removable valve seat member 14. The inner end of the bore 12 is provided with an annular sealing seat 15 arranged to be engaged by the shoulder 16 of the valve seat member 14. The valve seat member 14 is in the form of a sleeve and is preferably provided with a non-round bore 17 to permit the insertion of a tool for the purpose of firmly securing or removing it in position within the inlet connection 11. The upper portion of the valve seat member 14 is cylindrical and its top edge forms the valve seat 18.

The body 10 of the faucet is provided with the outlet or spout 20 which extends from the chamber 21 that surrounds the valve seat member 14. The upper end of the valve body 10 is provided with an upwardly extending cylindrical wall 22 the outer portion of the bore of which is threaded as indicated at 23. The inner end of the bore of the cylindrical wall 22 is reduced in diameter as indicated at 24 to provide a guide bearing for the outer smooth surface of the barrel 25.

The barrel 25 is provided with a non-round cap or head 26 which is larger in diameter than the cylindrical portion 22 of the valve body and shaped to receive a wrench for the purpose of detachably connecting the barrel to the valve body. The shoulder formed by the cap or head 26 of the valve body is arranged to seat on the washer 27 supported on the upper edge of the cylindrical portion 22 of the valve body for the purpose of sealing the cap with the body. The valve barrel is threaded externally as shown at 28 and is arranged to engage in thread 23 of the valve body while the remaining cylindrical portion of the barrel engages in the guide bearing 24.

The upper portion of the bore of the valve barrel 25 is provided with the valve operating thread 30 arranged to be threadably engaged by the valve operating thread 31 on the valve stem 32. The valve stem 32 is provided with an upwardly extending shank 33 which passes through the clearance hole in the head 26 and is provided with an ordinary operating handle 34 that is secured to the stem by means of the screw 35.

The lower end of the stem 32 is provided with a bore 36 arranged to receive the head 37 of the swivel section 38. The head 37 of the swivel section 38 is separated from the lower part by the pre-formed annular semi-circular recess 40 which when swedged into the bore 36 of the stem 32 sets and forms the outer cylindrical lip 41 deforming it to provide a complementary semi-spherical swivel connection.

The bottom of the swivel section 38 is provided with a recess for receiving the valve washer 42 arranged to engage and close on the valve seat 18. The valve washer 42 is held in place by the screw 43. The perimetral surface of the lower part of the swivel section 38 is cylindrical and is provided with an annular groove 44 for the purpose of receiving the packing member 45 which is a ring of circular cross-section arranged to seal against the inner cylindrical bore of the barrel 25. As shown in Fig. 1 the barrel 25 extends below the packing 45 when the valve washer 42 is closed on the valve seat 18. When the handle 34 is rotated in the proper direction to actuate the valve stem 32 and raise the washer 42 from the seat 18 the stem is drawn upwardly within the barrel and water is permitted to flow from the inlet 11 to the outlet 20 although no water is permitted to pass the packing member 45 between the stem and the barrel thereby protecting the valve operating threads from the water within the faucet. When the faucet is first assembled a lubricant is ordinarily applied to the valve operating threads but after extended use it is quite obvious that soapy water is apt to be deposited on the extended shank 33 and pass down through the cap 26 and on to the valve operating threads thereby continuously supplying an adequate lubricant for the valve operating threads.

Figure 2:
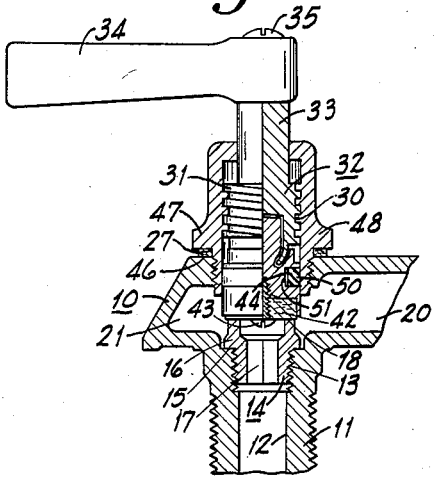
Fig. 2 is a view similar to Fig. 1 showing a modified form of the faucet barrel and seal.

Referring to Fig. 2 it will be noted that the faucet body 10 is not provided with the upwardly extending cylindrical portion 22 but is provided with an annular seat 46 arranged to receive the washer 27 and the non-round head 47 and the shoulder on the valve barrel 48 is disposed substantially intermediate of the ends of the barrel to compensate for the removal of the cylindrical portion 22 from the valve body. The bore of the barrel 48 is the same as that shown in Fig. 1 and the parts therein have the same relative position as that shown in Fig. 1. However, the packing ring 50 within the groove 44 is shown to be square in cross-section and is provided with a split back-up expanding ring 51.

Figure 3:
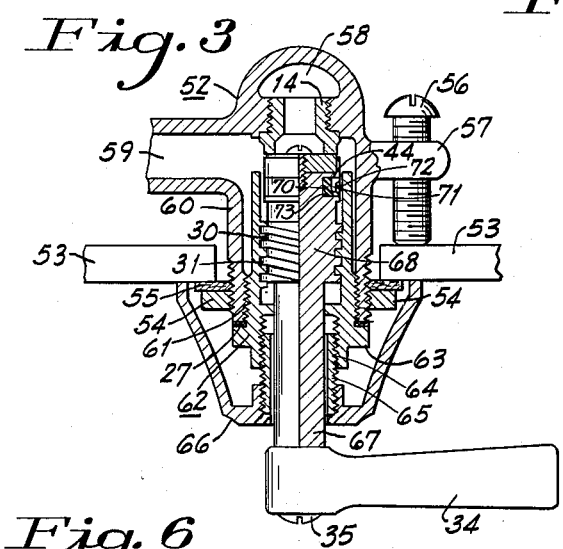
Fig. 3 is a sectional view of a recessed or hidden faucet comprising this invention the stem of which is solid.

In the structure shown in Fig. 3 the valve body 52 is mounted behind a splash board 53 and is held in place by means of the nut 54 which engages the washer 55 that surrounds the opening passing through the splash board 53 and reacts against the back-up mounting screw 56 that engages the back of the splash board and is adjustably positioned in a threaded opening passing through the lug 57 formed integral with the body 52. The valve body 52 is provided with the inlet passage 58 and the outlet passage 59 and is arranged to receive the valve seat member 14 therebetween. The cylindrical portion 60 of the valve body that extends through the opening in the splash board is threaded externally. The mounting nut 54 is threaded as shown at 61 to receive the complementary threads on the barrel 62. The barrel 62 is provided with a non-round head 63 arranged to receive a wrench for the purpose of securing the same to the body having a shoulder against which the washer 27 is compressed. The outer bore of the barrel 62 is threaded as indicated at 64 to receive a threaded nipple 65 that is arranged to screw into a threaded socket in the decorative shield 66. The bore of the nipple 65 and the shield 66 are arranged to pass over the extension 67 of the stem 68.

The stem 68 as shown in Fig. 3 is solid although the valve operating thread 31 and the annular packing groove 45 are in the same relative positions as that shown in the swivel stem of Figures 1 and 2. The packing 70 within the groove 44 of the stem 68 is substantially square in cross-section but is provided with an annular recess 71 that is disposed axially of the stem and opens toward the water chamber of the valve body thereby providing an annular lip 72 which engages a cylindrical portion of the bore of the barrel 62. The bore of the packing ring 70 remote of the recess opening 71 is cut away as indicated at 73 to provide a relief within the annular groove 44 to permit the water under pressure to deform the packing ring and provide an adequate seal between the stem 68 and the barrel 62.

Figure 4:
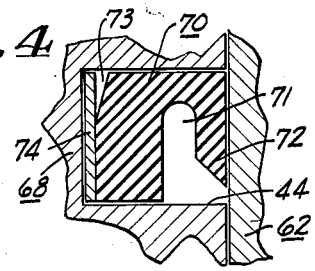
Fig. 4 is an enlarged detailed sectional view of a modified form of the barrel seal.

The packing 70 is also shown in Fig. 4. However, a split expanding ring 74 is placed under the packing in the annular groove 44 for the purpose of urging the packing 70 into engagement with the cylindrical bore of the barrel 62. When the expanding ring 74 is employed it is preferable that the packing ring 70 substantially fills the groove 44. However, when the packing 70 is employed without the ring 74 as shown in Fig. 3 it is preferable to make it slightly larger than the groove so as to insure initial engaging pressure between the packing surfaces of the groove 44, and the bore of the barrel.

Figure 5:
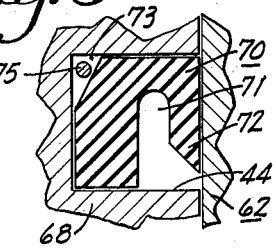
Fig. 5 is a view similar to Fig. 4 showing another modified form of the barrel seal.

The packing ring illustrated in Fig. 5 is the same as that shown in Fig. 3. An annular expansible coil spring member 75 is placed in recess 73 for the purpose of urging the end remote of the chamber 21 into engagement with the smooth cylindrical bore of the barrel 62. Thus, the annular spring 75 functions in a manner similar to that of the split expansion ring 74 of Fig. 4.

Figure 6:
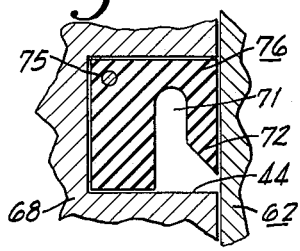
Fig. 6 is a view similar to Fig. 4 showing another modified form of the barrel seal.

The packing ring 76 illustrated in Fig. 6 is similar to the packing ring 70 with the exception that the recess 73 has been omitted and the coil spring 75 is embedded within the packing ring being vulcanized in place when the latter is formed. The spring is vulcanized in the ring in such a manner that it provides a radial expanding force on the packing member causing it to engage the smooth cylindrical bore of the barrel 62.

Each of the packing rings 45, 50, 70, and 76 may be made of any suitable elastomer material such as a rubber or a synthetic rubber or a synthetic plastic material that has elastic properties and will withstand elevated temperatures of the water and will resist the chemicals that may be contained in soaps. However, a fibrous packing of impregnated cotton felt or asbestos fiber such as used in plumbing will function satisfactorily.

When an annular ring of circular cross-section is employed as a packing as illustrated at 45 in Fig. 1 the groove 44 is preferably somewhat shallower than the diameter of the cross-section of the ring. However, the width of the groove may be of any desired dimension as this packing ring will function if the width of the groove is slightly less than the diameter of the cross-section of the packing ring or whether the width of the groove is greater than the width of the diameter in the cross-section of the packing ring. As shown in Fig. 1 the annular packing ring of circular cross-section will provide an adequate seal with the bore of the barrel and the sealing ring is worked when the faucet stem is actuated to raise and lower the washer against its seat and the swivel section 38 is held against rotation by the packing forces. In the case of the sealing ring of rectangular cross-section such as illustrated in Figures 3 to 6 the packing ring substantially fills the groove 44 but is required to extend slightly thereabove so as to insure its engagement with the smooth cylindrical bore of the barrel 62.

Any one of the packing rings 45, 50, 70, and 76 may be employed with either the swivel or the solid stem structure of the faucet. When a swivel stem structure is employed the friction of these annular packing rings is against the bore of the barrel and is sufficiently great to prevent the lower, or swivel section 38 of the stem, from rotating in which case the valve washer 42 is raised and lowered into or out of engagement with the seat 18. Under these conditions only relative axle movement is provided between the annular packing ring and the bore of the barrel. This structure thus provides a seal that has extremely long life both for the annular packing ring and the valve washer as the latter, if properly seated every time the faucet is opened and closed, is not subject to wear owing to its rotation into and out of engagement with its seat 18.

When either of the packing rings 45, 50, 70, and 76 are employed in the groove 44 of the structure shown in Fig. 3 they will of course be subjected to a rotary as well as an axial movement. The structure of this character obviously will wear out the valve washer 42 more rapidly than that of the structure of Figures 1 and 2. However, a combined rotary and axial movement does not seem to wear or affect the efficiency of the annular seals. These annular seals appear to be properly worked when subjected to axial or combined axial and helical movement by the rotation of the stem, which working seems to maintain the life of the seal member rather than to detract from its sealing action.

It will be noted that the valve seat 18 on the valve seat member 14 is provided with the shape of a slight inverted conical frustum with a rounded upper outer edge which has the tendency of crowding the material of the washer inwardly toward its center as a seat is formed on the washer 42 by the use of the valve. This crowding action retains the washer material causing it to flow inwardly to increase the density of the washer material thereby materially increasing the weaving quality of the washer.

I claim:

A faucet comprising a body having a valve chamber with an inlet and an outlet, and a threaded valve stem bore, a valve seat in said chamber between the inlet and outlet, an annular shoulder on the outer end of said valve stem bore to form a seat, a sealing washer on said seat, a tubular bushing threadably engaging said valve stem bore and having an outwardly extending annular shoulder to engage the sealing washer and maintain said tubular bushing in sealed relation with said body, a valve operating thread, and a smooth cylindrical surface in the bore of said tubular bushing opening into the valve chamber, a valve operating stem mounted in the bore of said bushing and having a complementary operating thread engaging the thread in said bushing, a socket on the inner end of said valve operating member surrounded by an annular skirt, a valve member having a head to revolve in said socket and an annular slot to rotatably receive said skirt, said annular slot and annular skirt being turned inwardly to retain the valve member swiveled on said valve operating stem, a cylindrical section on said valve coextensive with and snugly fitting the smooth cylindrical surface in said bore, a valve surface on the end of said valve member to co-operate with said valve seat in opening and closing the same when said valve operating stem is actuated, an annular groove intermediate the ends of said cylindrical surface, and an annular elastomer seal in said groove engaging and sealing on said cylindrical surface regardless of the position of the valve member.

DAVID E. GULICK.

References Cited in the file of this patent

UNITED STATES PATENTS

| Number | Name | Date |
| --- | --- | --- |
| 218,936 | Cooper | Aug. 26, 1879 |
| 319,538 | Woodbury | June 9, 1885 |
| 638,564 | Davies | Dec. 5, 1899 |
| 725,378 | Tetley | Apr. 14, 1903 |
| 995,247 | Garratt | June 13, 1911 |
| 1,147,399 | Hirst | July 20, 1915 |
| 1,285,286 | McCracken | Nov. 19, 1918 |
| 1,495,773 | Brown | May 27, 1924 |
| 1,508,102 | Holt | Sept. 9, 1924 |
| 1,570,568 | Howell | Jan. 19, 1926 |
| 1,833,343 | Tyler | Nov. 24, 1931 |
| 1,844,236 | Armentrout | Feb. 9, 1932 |
| 2,204,856 | Hinrichs | June 18, 1940 |
| 2,328,578 | Payne | Sept. 7, 1943 |
| 2,360,733 | Smith | Oct. 17, 1944 |

FOREIGN PATENTS

| Number | Country | Date |
| --- | --- | --- |
| 433 | Great Britain | of 1870 |
| 5,851 | Great Britain | of 1908 |
| 441,279 | Great Britain | of 1936 |